United States Patent [19]
Rowe

[11] Patent Number: 5,628,185
[45] Date of Patent: May 13, 1997

[54] GAS TURBINE ENGINE FUEL CONTROL SYSTEM

[75] Inventor: Arthur L. Rowe, Derby, England

[73] Assignee: Rolls-Royce plc, London, England

[21] Appl. No.: 439,172

[22] Filed: May 11, 1995

[30] Foreign Application Priority Data

May 27, 1994 [GB] United Kingdom ............... 9410760

[51] Int. Cl.$^6$ .................................................. F02C 9/28
[52] U.S. Cl. ........................................ 60/243; 60/39.281
[58] Field of Search ................. 60/39.141, 39.281, 60/226.1, 243

[56] References Cited

U.S. PATENT DOCUMENTS

| | | | |
|---|---|---|---|
| 4,594,849 | 6/1986 | Kenison et al. | 60/39.29 |
| 5,080,496 | 1/1992 | Keim | 374/144 |
| 5,379,584 | 1/1995 | Windish et al. | 60/204 |

FOREIGN PATENT DOCUMENTS

| | | |
|---|---|---|
| 687421 | 2/1953 | United Kingdom . |
| 1377951 | 12/1974 | United Kingdom . |
| 1159837 | 7/1979 | United Kingdom . |
| 2055975 | 3/1981 | United Kingdom . |

*Primary Examiner*—Louis J. Casaregola
*Attorney, Agent, or Firm*—Cushman, Darby & Cushman LLP

[57] ABSTRACT

A ducted fan gas turbine engine is provided with means for measuring the actual temperature of air exhausted from its high pressure compressor and means for computing a theoretical value of that temperature. The difference between the actual and theoretical temperatures is used to modulate the fuel flow to the engine so that in the event of the temperature difference being greater than a predetermined amount, the fuel flow to the engine during engine starting is reduced to prevent stalling of the high pressure compressor

7 Claims, 2 Drawing Sheets

GAS TURBINE ENGINE FUEL CONTROL SYSTEM

This invention relates to a gas turbine engine fuel control system.

BACKGROUND OF THE INVENTION

There are circumstances, fortunately rare, in which an aircraft mounted gas turbine engine ceases functioning during flight. If the engine is undamaged, an attempt is usually made to restart it. Normally this is not difficult to achieve since the engine continues to rotate as a result of the ram air flow which passes through it. However if the engine was operating at full power or near full power immediately prior to its ceasing to function, it can be difficult to restart. This is due to residual heat within certain parts of the engine heating up the air flowing through the engine to undesirably high levels. Such heated air has a particularly prejudicial effect upon the operating characteristics of the high pressure compressor of the engine. Specifically it has been found that the operating characteristics are degraded to such an extent that it is incapable of providing an air pressure rise sufficient to support the restarting and continued operation of the engine.

SUMMARY OF THE INVENTION

It is an object of the present invention to provide a gas turbine engine having a fuel control system which provides improved in-flight engine restarting.

According to the present invention, a gas turbine engine includes air compression equipment, an air temperature monitor positioned and arranged to provide an output signal representative of the actual temperature of air exhausted from said air compression equipment, means adapted to compute from suitable operating parameters of said engine the theoretical temperature of said air exhausted from said air compression equipment and to provide an output signal representative of said computed theoretical temperature, means to provide an output signal representative of the difference between said output signals representative of said actual and computed air temperatures, and fuel control means acting in accordance with said temperature difference signals during engine starting to modulate the fuel flow to said engine in a manner consistent with the effective starting of said engine.

BRIEF DESCRIPTION OF THE DRAWINGS

The present invention will now be described, by way of example, with reference to the accompanying drawings in which.

DETAILED DESCRIPTION OF THE INVENTION

Figure 1:
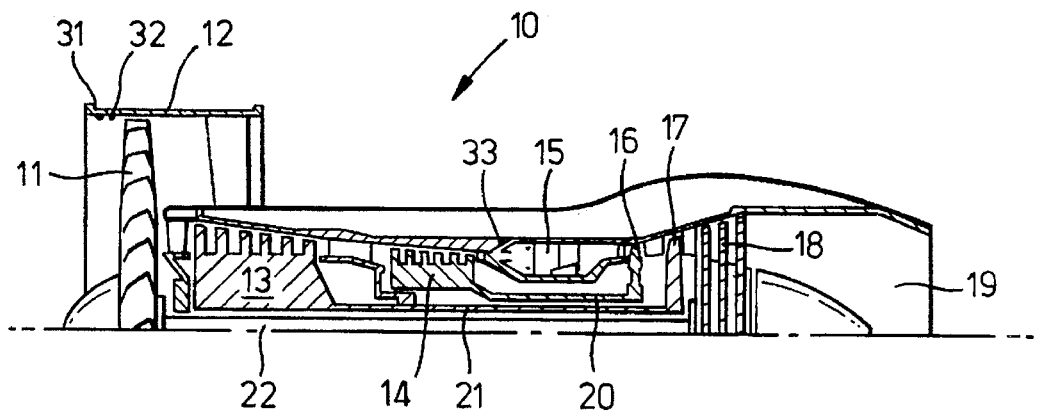
FIG. 1 is a sectioned side view of the upper half of a gas turbine engine in accordance with the present invention.

With reference to FIG. 1, a ducted fan gas turbine engine generally indicated at 10 comprises in axial flow series, a fan 11 contained within a fan duct 12, intermediate and high pressure compressors 13 and 14 respectively, combustion apparatus 15, high, intermediate and low pressure turbines 16, 17 and 18 respectively and an exhaust nozzle 19.

The gas turbine engine 10 functions in the conventional manner so that air drawn into the engine 10 by the fan 11 is divided into two flows. The first flow is exhausted through the fan duct 12 to provide propulsive thrust. The second flow is directed into the intermediate pressure compressor 13 where compression of the air takes place. The air then passes into the high pressure compressor 14 where additional compression takes place prior to the air being directed into the combustion apparatus 15. There the air is mixed with fuel and the mixture combusted. The resultant combustion products then expand through, and thereby drive, the high, intermediate and low pressure turbines 16, 17 and 18 respectively before being exhausted through the nozzle 19 to provide additional propulsive thrust.

The rotary portions of the high pressure turbine 16 and compressor 14 are interconnected by a shaft 20. Similarly, rotary portions of the intermediate pressure turbine 17 and compressor 13 are interconnected by a shaft 21 and the rotary portions of the low pressure turbine 18 and the fan 11 by a shaft 22. The shafts 20, 21 and 22 are hollow and concentric, and transmit drive from the turbine sections 11, 13 and 14 respectively.

During the operation of the gas turbine engine 10, heat is obviously generated in various parts of the engine. Clearly those parts of the engine 10 downstream of the combustion apparatus 15 will become very hot. However, a significant amount of heat is generated in the intermediate and high pressure compressors 13 and 14 as a result of the compression of the air passing through them. This eventually results in a rise in the steady state temperatures of the various components which make up the intermediate and high pressure compressors 13 and 14. Usually this does not constitute a problem in the effective operation of the compressors 13 and 14. This is because under normal steady state conditions, the rate of air flow through the compressors 13 and 14 is so high that the air is heated very little by the compressor components which it flows over. This is not the case however, if the engine is operating at or near full power, ceases operating and then is immediately restarted. During the restart procedure, a comparatively low rate of flow of air passes through the compressors 13 and 14. Typically this air enters the engine 10 as a result of the "windmilling" of the engine, that is, the rotation of the engine by virtue of its passage through air of the aircraft which conventionally carries it. However the various compressor 13 and 14 components which the air passes over are still comparatively hot from the previous normal operation of the engine 10. The air is therefore heated up by the components to a greater extent than would normally be the case. Unfortunately, the air is typically heated up to levels which have a significant effect upon the stability of at least the high pressure compressor 14. Consequently there is a danger of at least the high pressure compressor 14 stalling during the engine restarting procedure. This usually leads in turn to a failure of the engine restarting procedure.

The present invention is particularly concerned with the modification of the fuel supply to the engine 10 in order to reduce the danger of at least the high pressure compressor 14 stalling during such engine restarting.

In order to monitor the operation of the high pressure compressor 14, steps are taken to compare the actual temperature of air exhausted from it with a theoretical temperature derived from other suitable engine operating parameters. The difference between these temperatures is then used to modulate the fuel supply to the engine 10 during restarting in such a way that stalling of the high pressure compressor 14 is substantially avoided.

Figure 2:
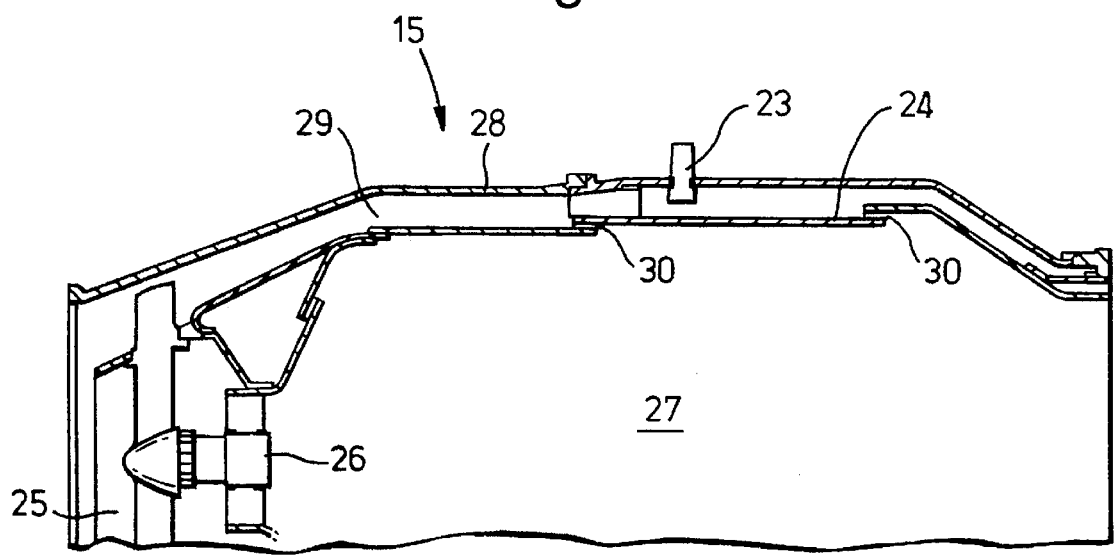
FIG. 2 is a sectioned side view of a portion of the combustion apparatus of the gas turbine engine shown in FIG. 1.

The actual temperature of the air exhausted from the high pressure compressor 14 is monitored by a plurality of thermocouples, one of which 23 can be seen adjacent to the combustion apparatus 15 if reference is now made to FIG. 2.

The combustion apparatus 15 is of generally conventional configuration comprising an annular combustion chamber 24 having a plurality of air inlets 25 at its upstream end. A fuel injector 26 is provided in each air inlet 25 to direct fuel into the combustion chamber interior where the combustion process takes place.

The combustion chamber 24 is surrounded in radially spaced apart relationship by a part 28 of the casing of the engine 10. The thermocouple 23, which is one of three such similar thermocouples, is located in the casing part 28 so as to protrude into the annular space 29 defined between the casing part 28 and the combustion chamber 24. The remaining two thermocouples (not shown) are similarly located to protrude into the annular space 29 so that all three thermocouples are equally circumferentially spaced apart from each other.

The thermocouples 23 measure the temperature of the air which operationally flows through the annular space 29 in order to provide cooling of the combustion chamber 24. Apertures 30 in the combustion chamber 24 wall permit air from the space 29 to flow into the combustion chamber 27 to provide further cooling and to take part in the combustion process.

The air which flows into the annular space 29 is part of the air flow exhausted from the high pressure compressor 14 and most of it flows into the combustion chamber 24 through its apertures 30. The remainder of the air flows, as previously stated, into the combustion chamber 24 through its upstream end air inlets 25. Consequently the air flowing through the annular space 29 is representative, in terms of temperature, of the air which is exhausted from the downstream end of the high pressure compressor 14.

It will be seen therefore that the output signal from the thermocouple 23 will be representative of that air temperature.

In order to determine whether the temperature of the air exhausted from the downstream end of the high pressure compressor 14 is higher than would normally be expected in a given situation, it is necessary to compute a theoretical value for that temperature in that particular situation. This is done by making use of other operating parameters of the engine 10. Specifically use is made of the outputs of pressure and temperature sensors 31 and 32 respectively positioned upstream of the fan 11 and pressure sensors 33 positioned near to the thermocouples 23 (FIG. 1).

The output signals from the various sensors are designated as follows:

| Temperature sensors | 32 | T20 |
|---|---|---|
| Pressure sensors | 31 | P20 |
| Pressure sensors | 33 | P30 |

If the theoretical expected output signal of the thermocouples 23 in a given situation is designated $T30_{synthesized}$, then $$T30_{synthesized}/T20 = f(P30/P20)$$

Figure 3:
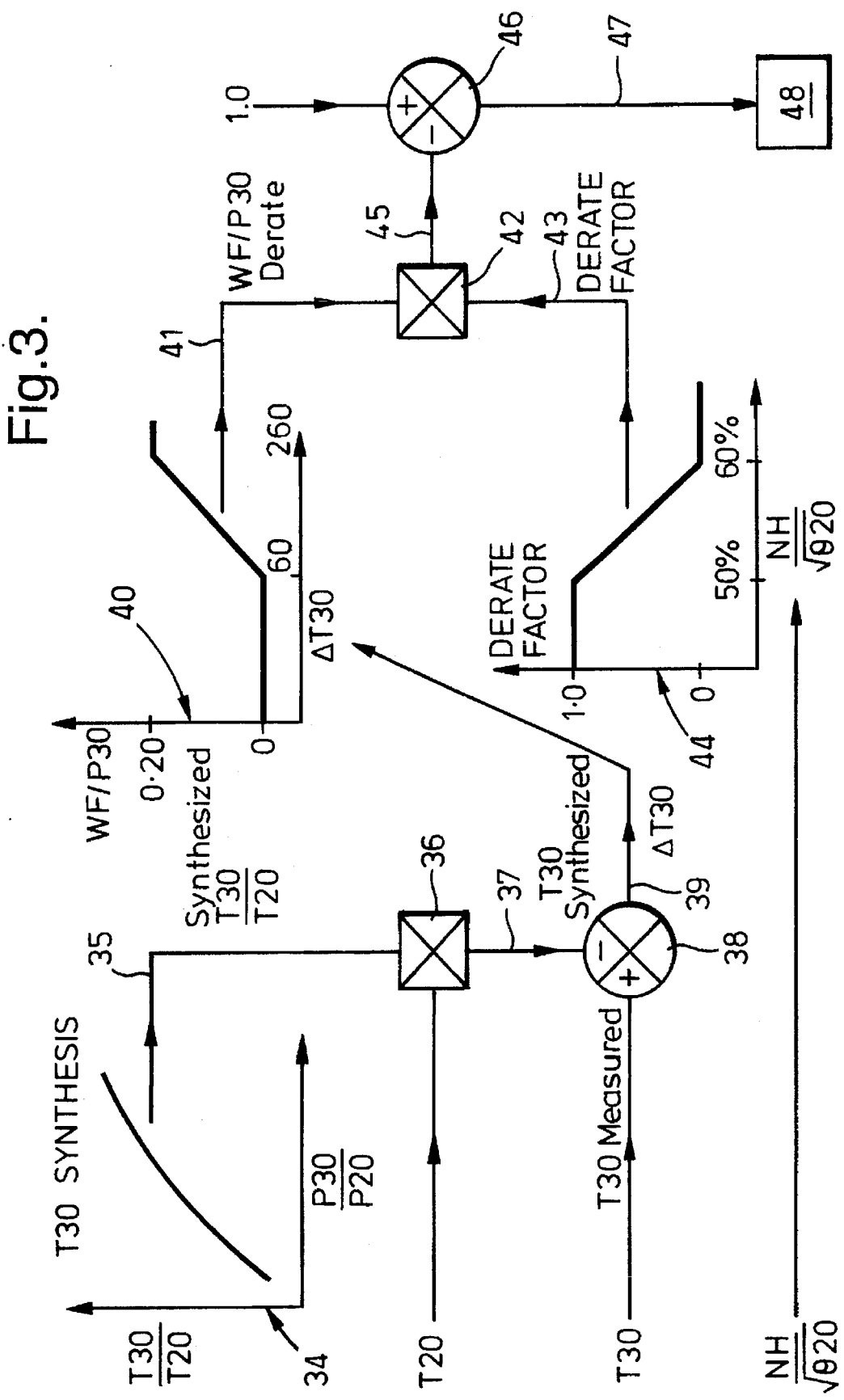
FIG. 3 is a schematic diagram of part of the fuel control system of the gas turbine engine shown in FIG. 1.

This relationship is depicted at 34 in FIG. 3.

This processing of the outputs signals T20, P30 and P20 provides an output signal 35 of $T30_{synthesized}/T20$. That output 35 is then processed by the multiplication device 36 which also has T20 as an input signal to provide an output signal 37 which is representative of $T30_{synthesized}$. The T30 output signal 37 is then directed to a summing and subtraction device 38 which is adapted to provide an output signal 39 which equals the difference between two input signals. The second input signal to the device 38 is the output signal T30 of the thermocouples 23, that is, representative of the actual temperature of the air exhausted from the downstream end of the high pressure compressor 14. The output signal from the thermocouple 23 is designated T30 measured. Thus the output signal of the device 38 which is designated ΔT30, equals $T30_{measured} - T30_{synthesized}$.

The signal ΔT30 is therefore representative of the difference between the actual temperature of the air exhausted from the downstream end of the high pressure compressor 14 and the theoretical temperature of the air which would be expected under normal engine running conditions The ΔT30 signal 39 is then compared with WF/P30 as depicted in the relationship at 40. WF is representative of the rate of flow of fuel to the engine 10 and P30 is, as previously stated, representative of the pressure of the air exhausted from the high pressure compressor 14.

The relationship depicted at 40 is selected such that if ΔT30 does not exceed 60° K., then there is no WF/P30 output. However if T30 exceeds 60° K., then there is a $WF/P30_{DERATE}$ output signal 41 which increases with increased ΔT30 up to a maximum of 0.20.

A value of ΔT30 in excess of 60° K. is likely to occur if there is excessive heating of the air passing through the high pressure compressor 14. This, as previously stated could occur if the engine 10 is operated at or near full power conditions, ceases operating and the attempts are made immediately to restart it.

The WF/P30 signal 41 is then directed into a multiplication device 42 which multiplies the signal 41 by a derate factor signal 43. The derate factor signal is derived from a relationship depicted at 44 between derate factor and NH/√θ20 which is an expression representative of the speed of rotation of the engine 10. Essentially if the rotational speed of the engine is less than 50% of what it should be under cruise conditions, the derate factor is 1. Consequently under these circumstances the output signal 45 of the multiplication device is the same as the input signal 41 which is WF/P30. However, as the engine speed increases to 60% of cruise, the derate factor 43 progressively decreases to zero. Consequently, if the speed of the engine 10 is greater than 60% of cruise speed, there is no output 45 from the multiplication device 42.

The multiplication device 42 output 45 is directed into a summing and subtraction device 46 which subtracts the output 45 from 1.0 to provide a final output signal 47. The final output signal 47 is then directed to the main fuel control unit 48 of the engine 10.

During normal engine operating conditions in which the engine 10 is rotating at or above its idle speed (that is when NH/√θ20 is greater than 60%) the derate factor signal 43 will be zero and so, consequently will be the multiplication device output signal 45. This results in the final output signal 47 being 1.0 and therefore having no effect upon the operation of the main fuel control unit 48.

However, if the engine 10 is operating at or near full power conditions, ceases operating and an immediate attempt is made to restart it, the air passing through the high pressure compressor 14 will be heated by the residual heat of the compressor 14 components. This, in turn will result in ΔT30, and hence the signal 39 increasing to such an extent that a WF/P30$_{DERATE}$ signal 45 will be dependent upon the rotational speed of the engine 10 and the magnitude of ΔT30. The summing and subtraction device 46 subtracts the output signal 45 from 1.0 to provide a final output signal 47. Since the final output signal is now less than 1.0, it has an effect upon the operation of the main fuel control unit 48 so that the rate at which fuel is supplied to the engine 10 is reduced. The amount by which the rate of fuel supply is reduced is arranged to be sufficient to change the stall characteristics of the high pressure compressor 14. The stall characteristics are changed to such an extent that during the engine 10 restarting procedure, the high pressure compressor 14 does not stall, thereby in turn permitting effective engine 10 restarting.

As soon as an effective engine restart has been achieved, the engine rotational speed increases, thereby in turn increasing the value of NH/√θ20 so that the derate factor signal 43 decreases to zero. This in turn leads to the output signal 45 from the multiplication device 42 also decreasing to zero, thereby causing the final output signal 47 to return to its original value of 1.0. As a consequence of this, the main fuel control unit 48 reverts to supplying fuel to the engine 10 at a normal rate, thereby permitting normal engine operation.

Although the present invention has been described with reference to the monitoring of the temperature of air exhausted from the downstream end of the high pressure compressor 14, it will be appreciated that the present invention is also applicable to the intermediate pressure compressor 13.

I claim:

1. A gas turbine engine including air compression equipment, an air temperature monitor positioned and arranged to provide an output signal representative of the actual temperature of air exhausted from said air compression equipment, means adapted to compute from suitable operating parameters of said engine the theoretical temperature of said air exhausted from said air compression equipment and to provide an output signal representative of said computed theoretical temperature, means to provide an output signal representative of the difference between said output signals representative of said actual and computed air temperature, and fuel control means acting in accordance with said temperature difference signal during engine starting to modulate the fuel flow to said engine in a manner consistent with the effective starting of said engine, wherein means are provided to monitor the air pressure and air temperature adjacent the air intake of said engine and the air pressure adjacent said air temperature monitor providing an output signal representative of the actual temperature of air exhausted from said air compression equipment, to provide said suitable operating parameters of said engine, and to compute therefrom said theoretical temperature of said air exhausted from said air compression equipment.

2. A gas turbine engine as claimed in claim 1 wherein means are provided to use said output signal representative of the difference between said actual and computed air temperatures to generate a further signal if said air temperature difference signal is greater than a predetermined value, said further signal being used to derive a signal to modulate said fuel flow to said engine.

3. A gas turbine engine as claimed in claim 2 in which said predetermined value of said temperature difference signal is representative of a temperature difference of greater than 60° K.

4. A gas turbine engine as claimed in claim 2 wherein means are provided to at least reduce said further signal in the event that the rotational speed of engine is greater than a predetermined value.

5. A gas turbine engine as claimed in claim 4 wherein said means are arranged to reduce said further signal in the event that the rotational speed of said engine is between 50 and 60% of its maximum speed.

6. A gas turbine engine as claimed in claim 4 wherein said means are arranged to eliminate said further signal in the event that the rotational speed of said engine is greater than 60% of its maximum speed.

7. A gas turbine engine as claimed in claim 1 wherein said air temperature monitor is a thermocouple.

* * * * *